UNITED STATES PATENT OFFICE.

WILLIAM G. LINDSAY, OF NEW YORK, N. Y., ASSIGNOR TO THE CELLULOID COMPANY, OF NEW YORK, N. Y., A CORPORATION OF NEW JERSEY.

SOLVENT FOR ACETYL CELLULOSE.

1,027,614.     Specification of Letters Patent.     Patented May 28, 1912.

No Drawing.     Application filed August 10, 1911. Serial No. 643,372.

*To all whom it may concern:*

Be it known that I, WILLIAM G. LINDSAY, a citizen of the United States, residing in the city of New York, county of New York, State of New York, have invented certain new and useful Improvements in Solvents for Acetyl Cellulose, of which the following is a specification.

The various compositions to which the present invention relates are employed in the arts, sometimes as imitations of natural substances and sometimes as films which are used for photographic purposes, whether as the base upon which the sensitive coating is superimposed, or as a component part of the film with which the sensitized substance has been partially incorporated in the sensitization.

Although the final or useful form of the different compounds of acetyl cellulose is that of a solid or dried material, the different processes of conversion into this final solid form involve, as is well understood, the employment of solutions or mixtures of varying consistencies as to plasticity, stiffness or fluidity, dependent generally upon the proportion and kind of solvent used to the amount of the original base- acetyl cellulose.

In the treatment of acetyl cellulose for the production of solutions for the manufacture of lacquers, varnishes, photographic films and flexible or plastic compounds, I have discovered that ethylenechlorhydrin, $CH_2ClCH_2OH$ a compound having a boiling point of 129° C., has a strong solvent power for acetyl cellulose and solutions made therefrom show a high viscosity and volatilize slowly. This solvent may be used either alone or in conjunction with other solvents or non-solvent liquids or solids, such as alcohol, ether, acetone, ethylacetate, camphor and its substitutes, etc.

It will be understood by those skilled in the art that acetone, for instance, is a solvent by itself of some varieties of acetyl cellulose, and it will likewise be understood that alcohol and ether are non-solvents, while again, epichlorhydrin and chloroform are solvents. This will instruct the operator that my new solvent may be used in conjunction with substances such as I have indicated which, either as solvents in themselves for acetyl cellulose or as non-solvents in themselves, are used to restrain the volatility of the other ingredients to adapt the compound for the individual purposes for which it is to be used and what varying degrees of temperature, pressure and atmospheric exposure should be used to accomplish the object.

As one example of a method of carrying out my invention practically I proceed as follows: I take one part of acetyl cellulose and introduce it into ten parts (by weight) of ethylenechlorhydrin and mix them thoroughly by stirring at the ordinary temperature of the room. The acetyl cellulose will dissolve slowly. Upon evaporation of the solvent there will be a resulting film.

The introduction of other solvents or non-solvents will have a resulting modification upon the length of time and the result produced by the use of my new solvent, but those actions and results will be readily understood by those skilled in the art.

What I claim and desire to secure by Letters Patent is:

1. A new composition of matter consisting of a solution of acetyl cellulose in ethylenechlorhydrin.

2. A new composition of matter consisting of a solution of acetyl cellulose in ethylenechlorhydrin in admixture with other substances either in liquid or solid form.

3. A new composition of matter consisting of a solution of acetyl cellulose in ethylenechlorhydrin in admixture with other substances with the accompaniment of inert matters to form solid or liquid compounds.

WILLIAM G. LINDSAY.

Witnesses:
   J. E. HINDON HYDE,
   MABEL DENTON.